US005611569A

United States Patent [19]
Sekiguchi et al.

[11] Patent Number: 5,611,569
[45] Date of Patent: Mar. 18, 1997

[54] VEHICLE SUBFRAME ASSEMBLY

[75] Inventors: Yoshitaka Sekiguchi; Takahiro Kamei, both of Saitama-ken, Japan

[73] Assignee: Honda Giken Kogyo Kabushiki Kaisha, Tokyo, Japan

[21] Appl. No.: 533,779

[22] Filed: Sep. 26, 1995

[30] Foreign Application Priority Data

Sep. 29, 1994 [JP] Japan .................................. 6-259542

[51] Int. Cl.⁶ ............................................... B62D 7/22
[52] U.S. Cl. ......................................... 280/788; 280/688
[58] Field of Search ..................................... 280/788, 690, 280/688

[56] References Cited

U.S. PATENT DOCUMENTS 4,826,203   5/1989   Lijima et al. ............................ 280/788
5,280,957   1/1994   Hentschel et al. ...................... 280/788

FOREIGN PATENT DOCUMENTS 61-39651   11/1986   Japan .

*Primary Examiner*—Kenneth R. Rice
*Attorney, Agent, or Firm*—Armstrong, Westerman, Hattori, McLeland & Naughton

[57] ABSTRACT

In a vehicle subflame including a pair of longitudinal members extending in parallel with each other along a longitudinal direction of a vehicle body, and lateral members extending across the longitudinal members, one of the lateral members is joined to said longitudinal members via a pair of leg sections which extend upright from the longitudinal member, and each of said leg sections is provided with a bearing portion for pivotably supporting an inner end of one of the lower arms of said wheel suspension system. Therefore, the load from the lower suspension arms can be supported by beating portions which are provided directly on the lateral member, and can be evenly transmitted to the lateral member. When the lateral member is provided with a Z-shaped cross section, the vertical and lateral loads can be supported with high rigidity and mechanical strength while the energy of a longitudinal impact can be favorably absorbed by well controlled deformation of the lateral member.

9 Claims, 6 Drawing Sheets

VEHICLE SUBFRAME ASSEMBLY

CROSS REFERENCE TO RELATED APPLICATIONS

The following applications on subject matters similar to those of the present application were contemporaneously filed by the same inventors, and the contents of these copending applications are incorporated in the present application by reference.

U.S. patent application Ser. No. 08/533,778 filed Sep. 26, 1995 (Our Ref: F427) (based on Japanese patent application No. 6-266301 filed Oct. 5, 1994); and U.S. patent application Ser. No. 08/534,083 filed Sep. 26, 1995 (Our Ref: F429) (based on Japanese patent application No. 6-259541 filed Sep. 29, 1994).

TECHNICAL FIELD

The present invention relates to a vehicle subframe assembly wherein a vehicle engine is mounted on a subframe which is interposed between a vehicle body and a wheel suspension system.

BACKGROUND OF THE INVENTION

It has been previously known to mount a subframe on a vehicle body via resilient bushes, and to pivotally attach the inner ends of the lower arms of a wheel suspension system to the subframe. The subframe typically comprises a pair of laterally spaced longitudinal members, and a plurality of lateral members passed across the longitudinal members. The longitudinal members and the lateral members are normally made by stamp forming sheet metal, and each member is typically provided with a closed cross section to the end of ensuring sufficient rigidity. For an example of such a subframe assembly, reference should be made to Japanese utility model publication (kokoku) No. 61-39651.

Typically, the lower arms of the suspension system are pivotally supported by bearing portions provided in one of the lateral members, and the lateral loads applied by the lower arms of the suspension system are therefore primarily supported by the lateral member.

The longitudinal and lateral members normally consist of sheet metal which is stamp formed and welded into profiled hollow members which have closed cross sections so that sufficient rigidity and mechanical strength can be ensured. Typically, each of the members is fabricated by stamp forming a U-shaped lower half, and an inverted U-shaped upper half, and welding them together by electric spot welding. Therefore, conventionally, it was not possible to integrally form bearing portions in the lateral member, and separate bracket members were therefore welded to the lateral member to form the bearing portions for the lower arms of the suspension system.

However, the brackets serving as the bearing portions are not capable of evenly distributing the load applied to the entire lateral member as they are simply welded to the lateral member. Therefore, the high rigidity and mechanical strength achieved by the closed cross section of the lateral member cannot be fully utilized for supporting the load applied by the lower arms of the suspension system.

It is conceivable to weld the brackets over a large surface area of the lateral member to improve their capability to transmit loads applied thereto, but it would inevitably increase not only the size and weight of the brackets but also the amount of welding work. The increase in the welding work leads to the increase in the effort required to control the quality of welding.

BRIEF SUMMARY OF THE INVENTION

In view of such problems of the prior art, a primary object of the present invention is to provide a vehicle subframe assembly which is easy and economical to fabricate.

A second object of the present invention is to provide a vehicle subframe which is light in weight and can still offer a high rigidity against loads applied from the wheel suspension system.

A third object of the present invention is to provide a vehicle subframe which is capable of favorably absorbing energy in case of a vehicle crash.

These and other objects of the present invention can be accomplished by providing a vehicle subframe, which is attached to a vehicle body, and supports at least part of a wheel suspension system, comprising: a pair of longitudinal members extending in parallel with each other along a longitudinal direction of the vehicle body; and at least one lateral member extending across the longitudinal members; one of the at least one lateral member being joined to the longitudinal members via a pair of leg sections, each of the leg sections being provided with a bearing portion for pivotably supporting an inner end of a lower arm of the wheel suspension system. Preferably, each of the leg sections extends substantially upright from the corresponding longitudinal member.

The leg sections can provide beating portions for pivotably supporting an inner end of a lower arm of the wheel suspension system as integral portions thereof, and the subframe can therefore offer a high rigidity against loads applied from the wheel suspension system. In particular, by forming the lateral member and the leg sections thereof from a single metal sheet, it is possible to evenly distribute the loads applied from the vehicle suspension system to the entire lateral member so that the effective rigidity and mechanical strength of the lateral member may be optimized for a given weight of the lateral member. This also simplifies the fabrication process, and can therefore reduce the fabrication cost.

Preferably, each of the bearing potions is defined by a pair of mutually opposing planar sections of a lower part of the corresponding leg section, the planar sections extending substantially laterally with respect to the vehicle body in a mutually spaced apart relationship. To further enhance the rigidity of the leg sections, edges of the planar sections facing away from the corresponding lower arm may be integrally joined together by a third planar section, and the lower ends of the leg sections may be welded to the corresponding longitudinal members substantially over the entire periphery thereof, normally with the exception of the sides from which the lower arms of the wheel suspension system extend. Additionally, the lateral member, in particular the upper ends of the leg sections, may be attached to the vehicle body to further increase the rigidity of the subframe with respect to the loads applied from the wheel suspension system.

According to a preferred embodiment of the present invention, the lateral members include a front lateral member, a rear lateral member, and an intermediate member, and the intermediate lateral member is provided with the leg sections. Each of the leg sections extends substantially upright from the corresponding longitudinal member, the lateral member being attached to the vehicle body at upper ends of the leg sections, and the bearing portions being provided within lower parts of the leg sections.

To reinforce the lateral member for supporting the lower arms of the wheel suspension system against lateral and vertical loads without substantially increasing the rigidity of the lateral member against longitudinal loads such as those produced as a result of a vehicle crash, the lateral member may be provided with a substantially Z-shaped cross section. Thereby, the subframe assembly will demonstrate a favorable energy absorbing property in case of a vehicle crash.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
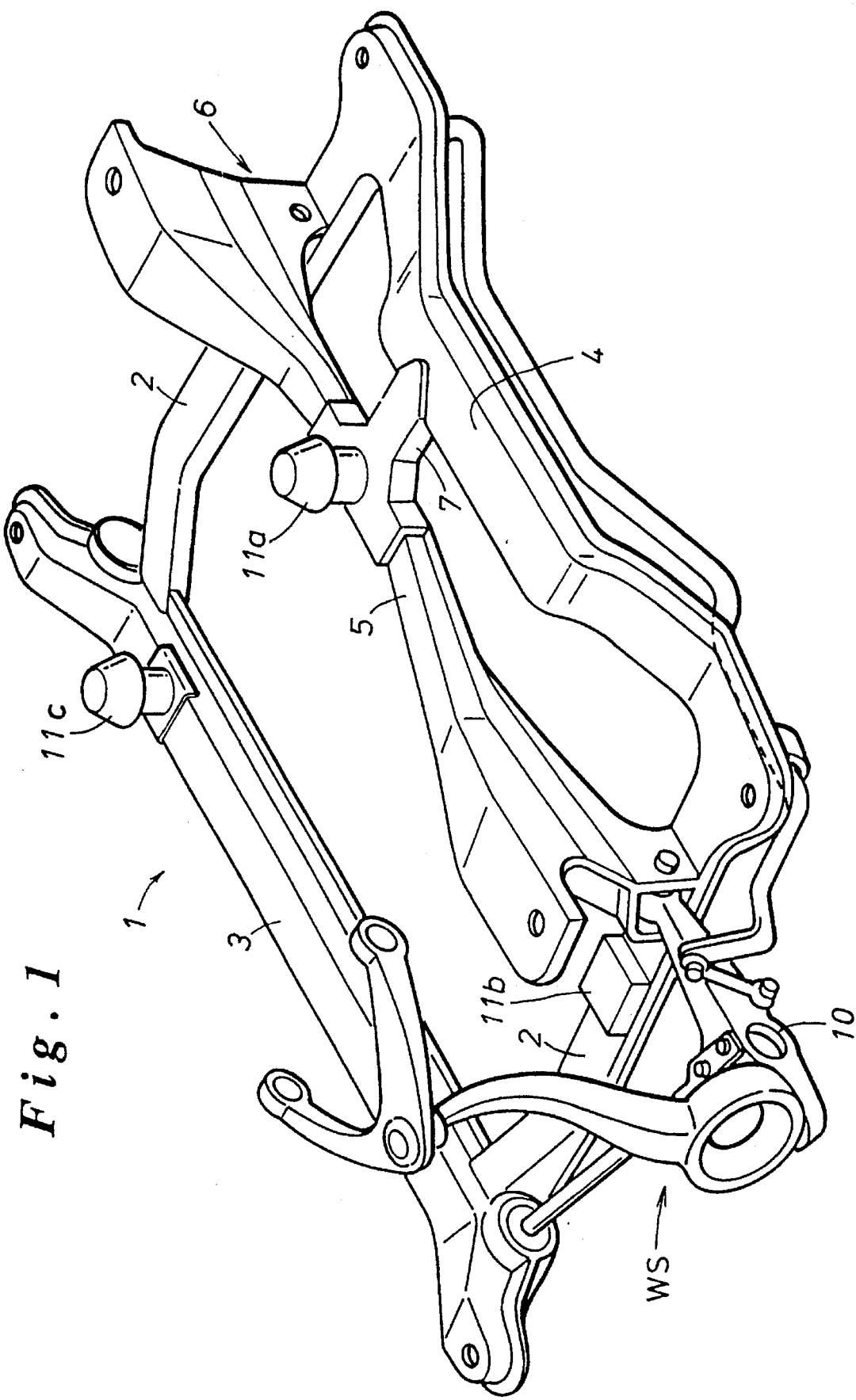
FIG. 1 is a perspective view showing an essential part of a preferred embodiment of the vehicle subframe assembly according to the present invention.
Figure 2:
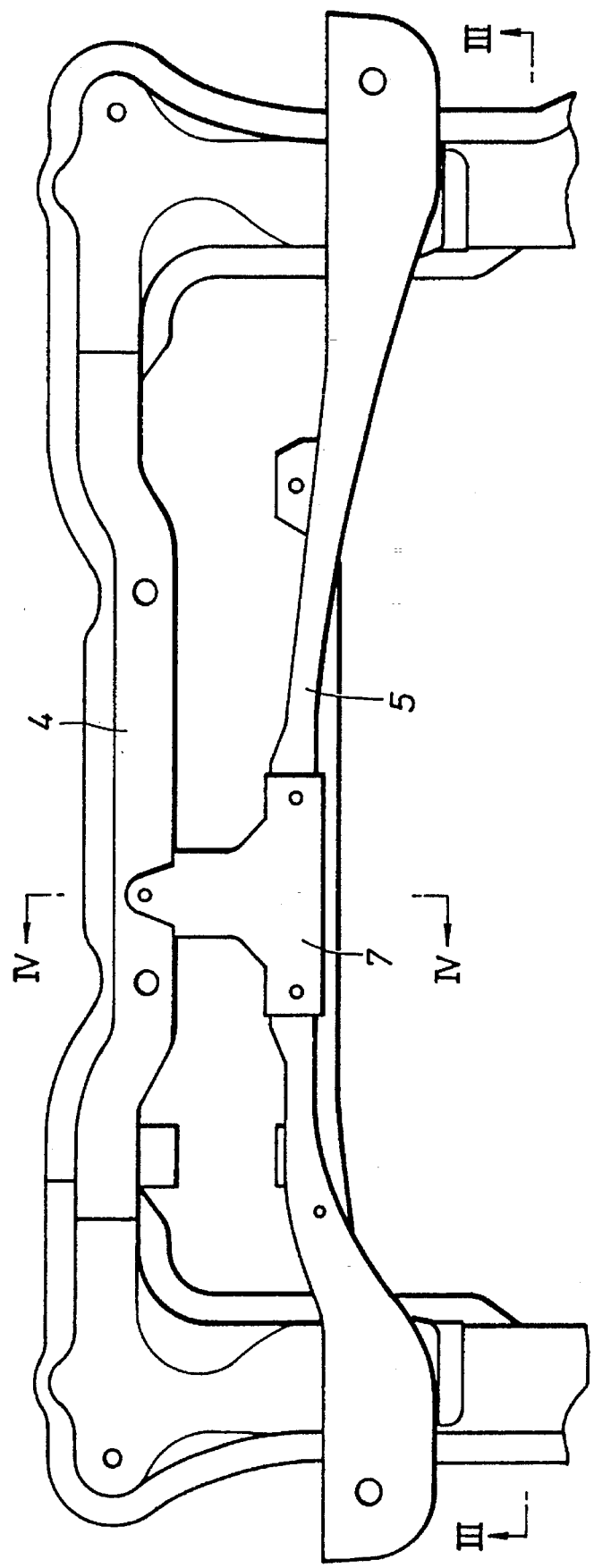
FIG. 2 is a plan view of a part of the subframe assembly of FIG. 1.

FIG. 1 shows a subframe 1 which is mounted on a vehicle body not to shown in the drawing, and supports the inner ends of the lower arms 10 of a wheel suspension system WS, of which only the left half of the wheel suspension system WS is shown in the drawing. The subframe 1 comprises a pair of laterally spaced longitudinal members 2, which extend in parallel with each other along the longitudinal direction of the vehicle body, front and rear lateral members 3 and 4, which extend across and over the longitudinal end portions of the longitudinal members 2, and an intermediate lateral member 5, which extends across the longitudinal members 2 somewhat behind and above the mid section of the subframe 1. In this embodiment, the middle part of the rear lateral member 4 is somewhat more elevated than the longitudinal members 2. The intermediate lateral member 5 is provided with a Z-shaped cross section, and is connected to the longitudinal members 2 via substantially upright leg sections 6 so that the intermediate lateral member 5 and the elevated middle part of the rear lateral members 4 extend in a substantially same horizontal plane.

Figure 3:
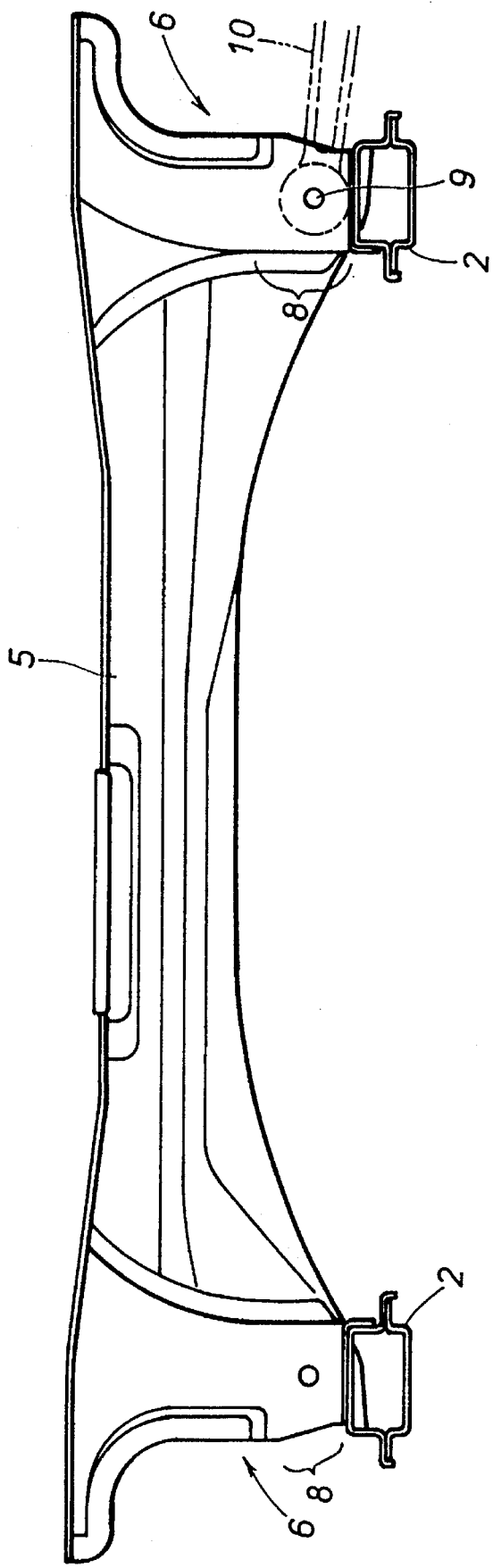
FIG. 3 is a sectional view taken along line III—III of FIG. 2.
Figure 4:
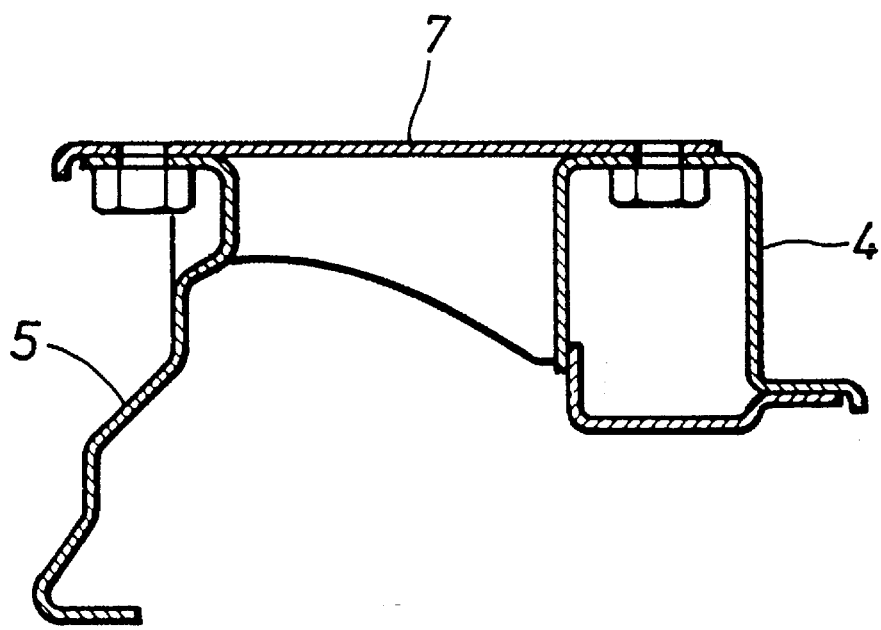
FIG. 4 is a sectional view taken along line IV—IV of FIG. 2.

The third lateral member 5, which is provided with a Z-shaped cross section, is relatively rigid against vertical loads, but is relatively deformable against longitudinal loads (Refer to FIGS. 3 and 4). Each of the leg sections 6, on the other hand, is provided with a rectangular closed cross section. In this embodiment, the intermediate lateral member 5 and the leg sections 6 are integrally formed by stamp forming a single metal sheet, and the leg sections 6 are then given a closed cross section by welding such as electric spot welding. The lower ends of the leg sections 6 are welded to the upper surfaces of the respective longitudinal members 2. Alternatively, the intermediate lateral member 5 and the leg sections 6 may consist of separate stamp formed members which are then joined together by welding.

A connecting member 7 extends across intermediate parts of the intermediate lateral member 5 and the rear lateral member 4. The connecting member 7 is provided with a generally planar main part which is attached to the intermediate and rear lateral members 4 and 5 by fastening means such as threaded bolts, and a pair of flanges 7a, which integrally depend from either side edge of the main part for reinforcement. The mounting holes provided in the lateral members 4 and 5 for attaching connecting members 4 and 5 consist of threaded holes formed for instance by welding nuts to them. The corresponding mounting holes provided in the connecting member 7 may consist of slots or relatively large circular holes so that slight dimensional adjustments can be made when the connecting member 7 is attached to the lateral members 4 and 5.

The engine, which is not shown in the drawings, is supported by three mounting points 11a, 11b, and 11c, provided in the upper surfaces of the connecting member 7, the front lateral member 3, and the rear lateral member 4, respectively. Because the mounting point 11a is supported by both the rear and the intermediate lateral members 4 and 5 by way of the connecting member 7, the rigidity required for the rear and the intermediate lateral members 4 and 5 can be reduced, and the weight of these members can be accordingly reduced. This is particularly significant when the mounting point 11a is placed in a relatively middle part of each the lateral members 4 and 5. The third mounting point 11c is supported solely by the front lateral member 3, but as it is more offset from the middle part of the lateral member, the stress applied by the engine to the front lateral member 3 is not as great as that applied to the intermediate and rear lateral members 4 and 5. The second mounting point 11b is provided in the left longitudinal member 2.

Figure 5:
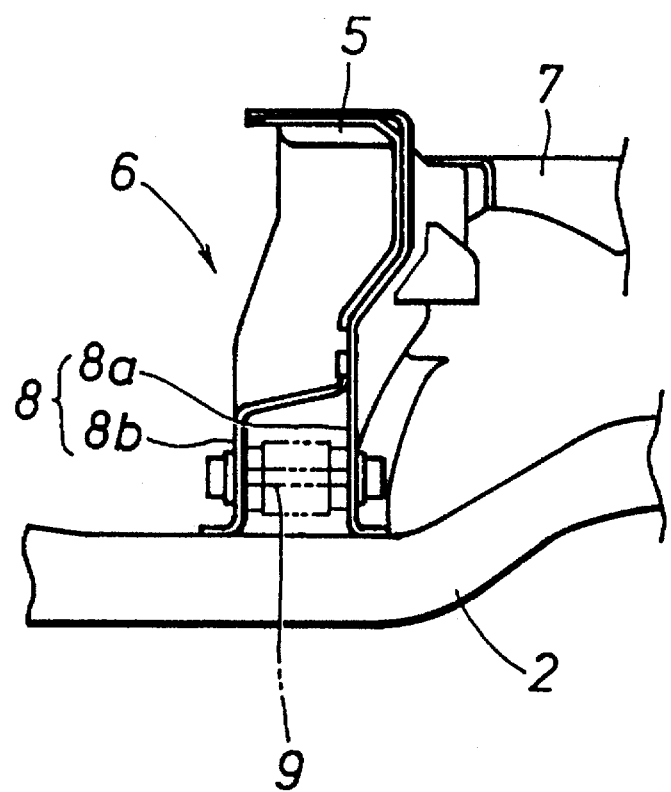
FIG. 5 is a fragmentary side view of the subframe assembly of FIG. 1.
Figure 6:
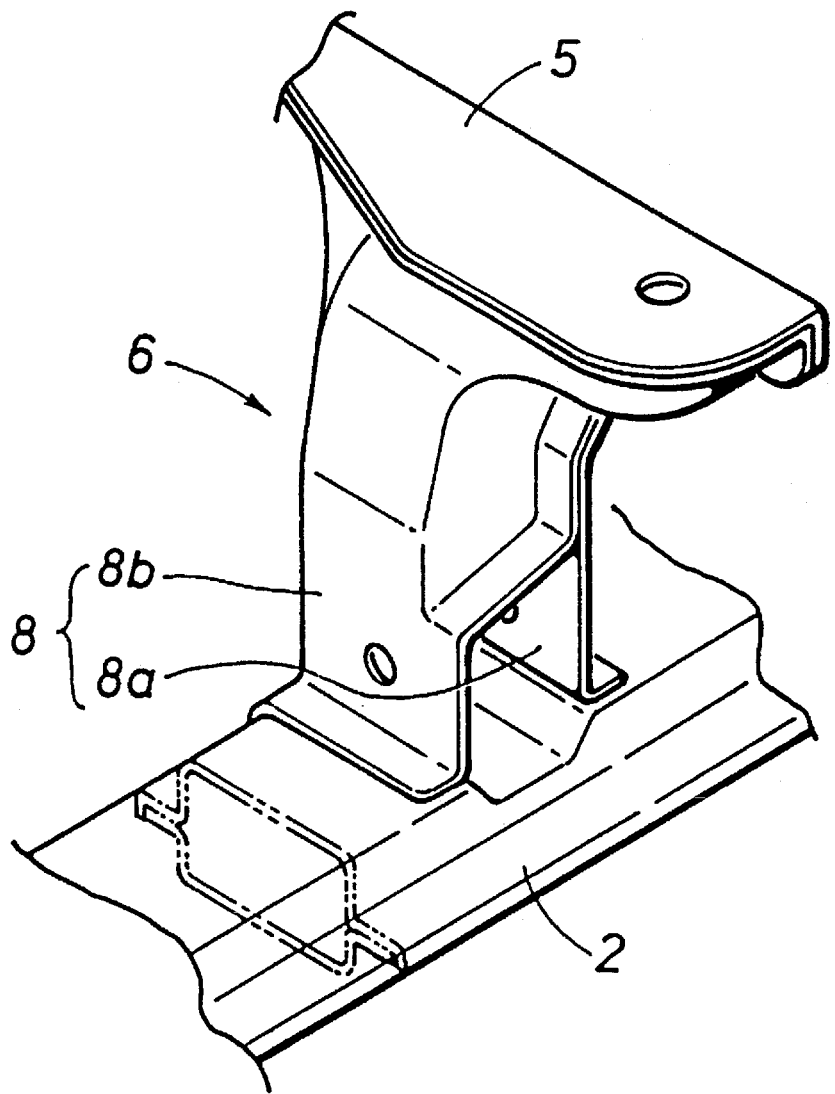
FIG. 6 is a fragmentary perspective view of the subframe assembly of FIG. 1.

As is best illustrated in FIGS. 5 and 6, a lower part of each of the leg sections 6 is provided with a bearing portion 8 which is defined by a pair of mutually opposing planar sections 8a and 8b. An inner end of each lower arm 10 of the wheel suspension system is pivotably supported by the corresponding bearing portion 8 via a pin 9 and a resilient bush, typically made of rubber, which is not shown in the drawings. The two planar sections 8a and 8b are joined by another planar section at a side facing away from the lower arm 10. Thus, each of the leg sections 6 has a closed cross section at its upper portion, and is provided with a C-shaped cross section at its lower portion, but the lower end of each leg section 6 is welded to the upper surface of the corresponding longitudinal member 2, whereby the leg sections 6 are each provided with great mechanical rigidity and great mechanical strength over its entire length. This is desirable because it increases the rigidity of the subframe with respect to the loads, such as the vibrations and noises produced by the wheel, which are applied to the bearing portion 8, and the vibrations and noises are prevented from being transmitted to the passenger compartment.

Thus, according to the present invention, because each of the leg sections, forming a part of the lateral member as an integral portion thereof, can provide a bearing portion for pivotably supporting the inner end of one of the lower arms of the wheel suspension system, the subframe can therefore offer a high rigidity against loads applied from the wheel suspension system. In particular, by forming the lateral member and the leg sections thereof from a single metal sheet, it is possible to evenly distribute the loads applied from the vehicle suspension system to the entire lateral member so that the effective rigidity and mechanical strength of the lateral member may be optimized for a given weight of the lateral member. This also simplifies the fabrication process, and can therefore reduce the fabrication cost. Additionally, the lateral member, in particular the upper ends of the leg sections, may be attached to the vehicle body to further increase the rigidity of the subframe with respect to the loads applied from the wheel suspension system.

Because the lateral member for supporting the lower arms of the wheel suspension system is provided with a substantially Z-shaped cross section, the lateral member is reinforced against lateral and vertical loads without substantially increasing the rigidity of the lateral member against longitudinal loads such as those produced as a result of a vehicle crash. Thereby, the subframe assembly will demonstrate a favorable energy absorbing property in case of a vehicle crash.

Although the present invention has been described in terms of a preferred embodiment thereof, it is obvious to a person skilled in the art that various alterations and modifications are possible without departing from the scope of the present invention which is set forth in the appended claims.

What we claim is:

1. A vehicle subframe for attachment to a vehicle body, and supports at least part of a wheel suspension system, comprising:
    a pair of longitudinal members extending in parallel with each other along a longitudinal direction of said vehicle body; and
    at least one lateral member extending across said longitudinal members;
    one of said at least one lateral member being joined at its opposite ends to said longitudinal members by a pair of leg sections, each of said pair of leg sections having a bearing portion for pivotally supporting an inner end of a lower arm of said wheel suspension system between said leg sections adjacent said lateral member.

2. A vehicle subframe according to claim 1 having a front lateral member, a rear lateral member, an intermediate lateral member, said intermediate lateral member being joined at said opposite ends to said longitudinal members by said leg sections.

3. A vehicle subframe according to claim 2, wherein each of said leg sections extends substantially upright from a corresponding longitudinal member.

4. A vehicle subframe according to claim 3, wherein each of said bearing portions is defined by a pair of mutually opposing planar sections of a lower part of a corresponding leg section, said planar sections extending substantially laterally with respect to said vehicle body in a mutually space apart relationship.

5. A vehicle subframe according to claim 4, wherein edges of said planar section facing away from a corresponding lower arm are integrally joined together by a third planar section.

6. A vehicle subframe according to claim 1, wherein said one of said at least one lateral member has a substantially Z-shaped cross section.

7. A vehicle subframe according to claim 6, wherein said one of said at least one lateral member and said leg sections thereof are integrally formed substantially from a single metal sheet.

8. A vehicle subframe according to claim 7, wherein said one of said at least one lateral member is attached to said vehicle body.

9. A vehicle subframe according to claim 8, wherein each of said leg sections of said pair of leg sections extends substantially upright from a corresponding longitudinal member, said one of said at least one lateral member being attachable to said vehicle body at upper ends of said leg sections, and said bearing portions being within lower parts of said leg sections.

* * * * *